US010007241B1

(12) United States Patent
Hedin et al.

(10) Patent No.: US 10,007,241 B1
(45) Date of Patent: Jun. 26, 2018

(54) SYSTEM AND METHOD FOR REMOTELY CONTROLLING BEHAVIOR OF MULTIPLE DEVICES (71) Applicant: Suterra, LLC, Los Angeles, CA (US)

(72) Inventors: Andrew Hedin, Milwaukee, WI (US); Joseph Bonniwell, Grafton, WI (US); Matt Hamman, Bend, OR (US)

(73) Assignee: Suterra, LLC, Los Angeles, CA (US)

( * ) Notice: Subject to any disclaimer, the term of this patent is extended or adjusted under 35 U.S.C. 154(b) by 479 days.

(21) Appl. No.: 14/697,885

(22) Filed: Apr. 28, 2015

(51) Int. Cl.
| G05B 15/02 | (2006.01) |
| H04W 4/00 | (2018.01) |
| A01M 1/02 | (2006.01) |
| B05B 12/02 | (2006.01) |
| H04W 4/80 | (2018.01) |

(52) U.S. Cl.
CPC .............. *G05B 15/02* (2013.01); *A01M 1/02* (2013.01); *B05B 12/02* (2013.01); *H04W 4/008* (2013.01); *H04W 4/80* (2018.02)

(58) Field of Classification Search
CPC .......... A01M 1/02; B05B 12/02; G05B 15/02; H04W 4/008; H04W 4/80
See application file for complete search history.

(56) References Cited

U.S. PATENT DOCUMENTS

| 8,284,053 B2 | 10/2012 | DeLine |
| 8,554,688 B2 | 10/2013 | Harrell et al. |
| 9,468,162 B2 * | 10/2016 | Weiler .................... A01G 25/16 |
| 9,715,223 B2 * | 7/2017 | Chandler ............. G05D 7/0629 |
| 2002/0176388 A1 | 11/2002 | Rankin et al. |
| 2004/0236443 A1 * | 11/2004 | Ware .................. G05B 19/0421 700/90 |
| 2009/0281190 A1 * | 11/2009 | Khaskin .................. A01N 25/18 514/570 |
| 2009/0294471 A1 * | 12/2009 | Paige ........................ A61L 2/22 222/36 |
| 2010/0096409 A1 * | 4/2010 | Wainwright ........ A01M 1/2038 222/181.2 |
| 2011/0111700 A1 * | 5/2011 | Hackett .................. A01G 25/16 455/41.2 |
| 2012/0006847 A1 * | 1/2012 | Coe ........................ A61J 7/0481 222/52 |

(Continued)

*Primary Examiner* — Kenneth M Lo
*Assistant Examiner* — Michael J Huntley
(74) *Attorney, Agent, or Firm* — Michael Best & Friedrich LLP (57) ABSTRACT

A system and method for remotely controlling behavior of multiple devices are presented. The system comprises a plurality of devices, e.g. puffers, and a remote master controller. Each device includes a radio frequency (RF) control system for programming and control of its operation. The communication between the puffer and the master controller during mass programming is through Bluetooth Low Energy peripheral mode and observer mode. Using its peripheral mode, the master controller advertises a desired program for the puffers in an orchard through a custom UUID. Each puffer picks up and parses the custom UUID and reprograms itself. Each puffer also uses its peripheral mode to advertise its configuration to be picked up by the master controller so that the master controller can verify that the puffer has correctly reprogrammed itself based on the mass programming advertisement.

23 Claims, 5 Drawing Sheets (56) References Cited

U.S. PATENT DOCUMENTS

| | | | |
|---|---|---|---|
| 2012/0042563 A1* | 2/2012 | Anderson | A01G 1/00 43/132.1 |
| 2013/0060389 A1* | 3/2013 | Marsters | A01G 25/16 700/284 |
| 2013/0334247 A1 | 12/2013 | Lee et al. | |
| 2014/0074285 A1 | 3/2014 | Wegelin et al. | |
| 2014/0117043 A1* | 5/2014 | Ware | B65D 85/84 222/95 |
| 2014/0188348 A1 | 7/2014 | Gautama et al. | |
| 2014/0263425 A1* | 9/2014 | Akdogan | G07F 9/026 222/39 |
| 2014/0355582 A1 | 12/2014 | Kamath et al. | |
| 2014/0370917 A1 | 12/2014 | Buchheim et al. | |
| 2015/0011970 A1 | 1/2015 | Kamen et al. | |
| 2015/0019029 A1* | 1/2015 | Chandler | A61L 9/035 700/283 |
| 2015/0026229 A1 | 1/2015 | Chung et al. | |
| 2015/0099467 A1* | 4/2015 | Kang | H04W 4/008 455/41.2 |
| 2015/0308084 A1* | 10/2015 | Thompson | G05D 23/1393 700/283 |
| 2016/0100533 A1* | 4/2016 | Bauman | A01G 25/16 700/284 |
| 2016/0219933 A1* | 8/2016 | Henry, Jr. | G08C 17/02 |
| 2016/0339134 A1* | 11/2016 | Murahari | A61L 9/14 |

* cited by examiner

SYSTEM AND METHOD FOR REMOTELY CONTROLLING BEHAVIOR OF MULTIPLE DEVICES

BACKGROUND OF THE INVENTION

Field of the Invention

Embodiments of the invention relates to remote device control. More specifically, the invention relates to a system and method for remotely controlling behavior of multiple pheromone dispensing devices in a commercial agricultural environment.

Description of the Related Art

In a commercial agricultural environment, such as orchards, pheromone dispensers (aka puffers) are employed for pest control. The dispensers are generally programmable to be operational within a wide variety of operating modes, such as starting and ending operations at specific times during the day, operational during specific events, e.g. days of the week, temperatures, seasons, and dispensing frequency.

In large orchards, which are typical of commercial agriculture, there are multiple dispensers, e.g. hundreds or even thousands, dispersed throughout a wide geographic area. Customers may have thousands of units deployed across a wide geographic area. In the current systems, each puffer must be programmed by hand using control buttons on the unit. Programming hundreds of puffers takes a long time and also introduces a high degree of human error. Once the puffer is installed in a tree, it must remain functional for a long period of time, e.g. at least 250 days, before it is taken down at the end of the growing season. Currently, the puffer cabinets must be brought down from each tree to assess their operation. This may difficult and time consuming since a field crew may need to check hundreds of units each day. After the season, and before the start of the next, the puffers are cleaned, batteries are replaced, and new aerosol canisters are installed. Each puffer unit is designed to be able to function for at least 5 years with proper maintenance.

Bluetooth Low Energy (BLE) is a wireless personal area network technology used for transmitting data over short distances. BLE is designed for low energy consumption and cost, while maintaining a communication range similar to that of normal Bluetooth.

BLE communication consists primarily of "Advertisements", or small packets of data, broadcast at a regular interval by Beacons or other BLE enabled devices via radio waves. BLE Advertising is a one-way communication method whereby beacons that want to be "discovered" broadcast self-contained packets of data in set intervals. These packets are normally collected by devices like smartphones, where they can be used for a variety of smartphone applications to trigger things like push messages, app actions, and prompts.

Standard BLE has a broadcast range of up to 100 meters, which make Beacons ideal for location tracking and awareness in a confined space.

iBeacon is Apple's technology standard for Bluetooth Low Energy communication. iBeacon allows applications (Mobile Apps) running on both iOS and Android devices to listen for signals from beacons in the physical world and react accordingly. The optimal broadcast interval for iBeacon is 100 ms.

iBeacon implements a standardized format for BLE Advertising. Under this format, an advertising packet consists of four main pieces of information: (1) a Universally Unique Identifier (UUID); (2) Major; (3) Minor; and (4) Tx Power.

What is needed, therefore, is a system in which multiple dispensers are faster and easier to remotely program on a large scale basis, e.g. using over the air transmission, while providing a user the ability to assess the status and operation of each unit without having to retrieve the unit from its installed location, e.g. a tree.

BRIEF SUMMARY OF THE INVENTION

One or more embodiments of the invention are directed a system and method for remotely controlling behavior of multiple remote devices. In some environments, it is necessary to remotely control the behavior of multiple remote devices, especially those devices that may be placed in positions where they are not easily accessible. For instance, in an agricultural environment, remote devices such as insecticide dispensers, nutrient dispensers, or other combination of programmable devices that may be employed to control the crop are sometimes placed on trees where they are not easily accessible. An example programmable device used in orchards is a pheromone dispenser, also known as a puffer.

In one or more embodiments comprise a plurality of puffers and a remote master controller. Each puffer includes a radio frequency (RF) control system for programming and control of its operation. Each puffer and the master controller are all capable of Bluetooth Low Energy (BLE) operation. In BLE, each puffer and the master controller can operate in both an observer mode and a peripheral mode. In normal operation, each puffer uses its peripheral mode to advertise its program configuration to be picked up by a listening master controller.

In one or more embodiments, a mass programming mode is used to remotely reprogram the plurality of puffers in an orchard. The communication between the puffer and the master controller during mass programming is through BLE operation.

During mass programming, the master controller uses its peripheral mode to advertise a desired program for the puffers in an orchard through a custom UUID. Each puffer, in observer mode, picks up and parses the custom UUID and reprograms itself and updates its custom UUID. As each puffer in peripheral mode continues to advertise its program configuration via its custom UUID, which should now have the updated program information, the master controller picks up the puffer UUID and parses the information to verify that the puffer has correctly reprogrammed itself based on the mass programming advertisement.

In one or more embodiments, the remote master controller is a smart device, i.e. an electronic device that can be connected to other devices or networks via different wireless protocols such as Bluetooth, NFC, Wi-Fi, etc., and that can operate to some extent interactively and autonomously (e.g. a smartphone, tablet computer, laptop, smart watches, smart bands, etc.).

In one or more embodiments, the remote master controller includes a radio frequency communication capability, e.g. a Bluetooth Low Energy (BLE) radio for communication. The master controller is also capable of operating alternately in listening (e.g. BLE Observer) mode and advertisement (e.g. BLE Peripheral) mode. In the master controller advertisement mode, e.g. BLE peripheral mode, the master controller broadcasts configuration changes (e.g. puffer program) for the plurality of puffers using a custom UUID. In listening mode, the master controller receives the puffer custom UUID from each of the plurality of puffers and uses information therein in determining if the puffer has successfully reprogrammed itself.

In one or more embodiment, each puffer cabinet functionally comprises an Aerosol Can for dispensing chemicals, e.g. pheromones; and a Wireless Puffer Control system.

The aerosol can dispenses a predetermined amount of chemicals per event and preferably contains enough chemicals to last through at least one growing season. An exemplary puffer system dispenses about 40 mg during each puff and each aerosol can contains about 400 grams of pheromones.

Each one of the plurality of puffers is programmable via over the air updates to selected operational modes using radio frequency communication, e.g. Bluetooth Low Energy (BLE) communication. In a preferred embodiment, each puffer operates alternately in listening mode and advertisement mode. In the puffer advertisement mode, e.g. BLE peripheral mode, each puffer broadcasts advertisements comprising a custom universally unique identifier (UUID). The custom UUID may comprise the puffer's configuration, operational status (e.g. battery life, fuel quantity, etc.), address, location information (e.g. GPS coordinates), or a combinations thereof.

In one or more embodiments, each puffer scans the appropriate frequencies for advertisements from the remote master controller and uses information contained therein to reprogram itself.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising a system and method for remotely controlling behavior of multiple devices will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

The term "puffer", "puffer unit", "puffer cabinet" and "dispenser" are used interchangeably throughout this document.

One or more embodiments of the present invention relate to mass programming and control of a plurality of remote devices in an agricultural environment, e.g. an orchard. In some environments, it is necessary to remotely control the behavior of multiple remote devices, especially those devices that may be placed in positions where they are not easily accessible. For instance, in an agricultural environment, remote devices such as insecticide dispensers, nutrient dispensers, or other combination of programmable devices that may be employed to control the crop are sometimes placed on trees where they are not easily accessible. An example programmable device used in orchards is a pheromone dispenser, also known as a puffer. Thus, in the description that follows, mass programming of puffers would be used in the exemplary system to illustrate one or more embodiments of the invention.

One or more embodiments of the present invention comprise a system with a plurality of puffers and a remote master controller. Each puffer includes a radio frequency (RF) control system for programming and control of the operation of the puffer. The communication between the puffer and the master controller could be through a broadcast mode or a connections mode. Broadcast mode enables programs to be sent from one remote master controller device to many remote puffers at once, and for each puffer cabinet to broadcast its status and program information to be picked-up by a listening remote master controller device. Thus, each puffer and the remote master controller may operate alternatively between broadcast (e.g. BLE peripheral) mode and listening (e.g. BLE central or observer) mode.

The connections mode provides a two-way communication link between a specific puffer and a remote master controller device. In the connections mode, a master controller is able to query a specific puffer, perform diagnostics and other services specific to a particular puffer.

The objective of each puffer is to dispense pheromones from a metered aerosol can at regular intervals ("puff intervals"). In typical operation in an orchard, a puffer is placed in a tree approximately 10-30 feet off of the ground and one or more puffers are placed per acre. When a puffer is placed in a tree it is expected to operate independently for approximately 250 days (e.g. a growing season). Puffers may be placed in a tree 1-2 months before the season starts.

Each puffer dispenses pheromones at a puff interval. Puff intervals may be set, for example, at one puff every 15 minutes for 12 hours, one puff every 30 minutes for 24 hours, at a schedule dictated by the environment or as desired. Each puffer program (i.e. puff schedule) may include a start delay to control when the first puff occurs.

In one or more embodiments, the program is downloaded to each puffer in the orchard via mass programming by a master controller using BLE advertisement mode. Mass programming will be discussed further below.

One or more embodiments of the present invention using puffers as the device to be remotely controlled will now be described in detail with references to FIGS. 1-4.

Figure 1:
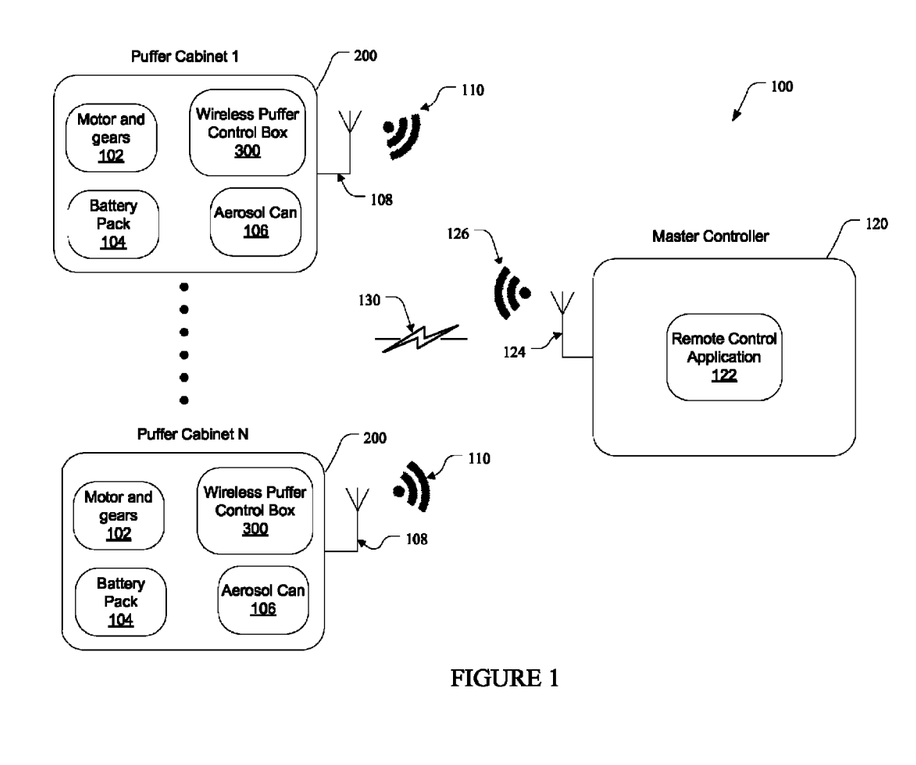
FIG. 1 is a functional level illustration of the wireless puffer control system architecture in accordance with one or more embodiments of the present invention.

FIG. 1 is a functional level illustration of the wireless puffer control system architecture in accordance with one or more embodiments of the present invention. As illustrated, system 100 of the present invention comprises a plurality of programmable puffer cabinets 200, e.g. Puffer Cabinet 1 to Puffer Cabinet N, where N could be any number greater than 1; and a master controller 120.

As illustrated, each puffer cabinet 200 functionally comprises Motor and Gears 102, Battery Pack 104; Aerosol Can 106; Wireless Puffer Control Box 300 and Wireless Antenna 108.

Metered aerosol can 106 dispenses a predetermined amount of chemicals per event and preferably contains enough pheromones to last through at least one growing season. An exemplary puffer system dispenses about 40 mg during each puff and a typical aerosol can contains about 400 grams of pheromones.

Each one of the plurality of puffers is programmable via over the air updates to selected operational modes using radio frequency communication, e.g. Bluetooth Low Energy (BLE) communication. In a preferred embodiment, each puffer operates in both listening mode and advertisement mode. In the puffer advertisement mode, e.g. BLE peripheral mode, each puffer broadcasts advertisements comprising a custom universally unique identifier (UUID). The custom UUID may comprise the puffer's configuration, operational status (e.g. battery life, fuel quantity, etc.), location information (e.g. GPS coordinates), or a combinations thereof.

In the puffer listening mode, each puffer scans the appropriate frequencies for advertisements from master controller 120. Detailed operation of the puffer in the listening mode is presented below in the description of mass programming operation.

Master controller 120 is preferably a smart device, i.e. an electronic device that can be connected to other devices or networks via different wireless protocols such as Bluetooth, NFC, Wi-Fi, etc., and that can operate to some extent interactively and autonomously (e.g. a smartphone, tablet computer, laptop, smart watches, smart bands, etc.). In one or more embodiments, master controller 120 comprises radio frequency communication capability, e.g. a Bluetooth Low Energy (BLE) radio for communication. The master controller is also capable of operating in both listening mode and advertisement mode. In the master controller advertisement mode, e.g. BLE peripheral mode, the master controller broadcasts configuration changes (e.g. a puffer program) for the plurality of puffers 200 using a custom UUID. In listening mode, the master controller receives the puffer custom UUID from each of the plurality of puffers and uses information therein in determining if the puffer has successfully reprogrammed itself.

Thus, each of the plurality of puffers, during its listening mode, receives the master controller broadcasts of a custom UUID containing a desired program. The puffer updates its program memory to match the program changes, and updates its configuration and operational status in its own broadcast of its custom UUID.

Figure 2A:
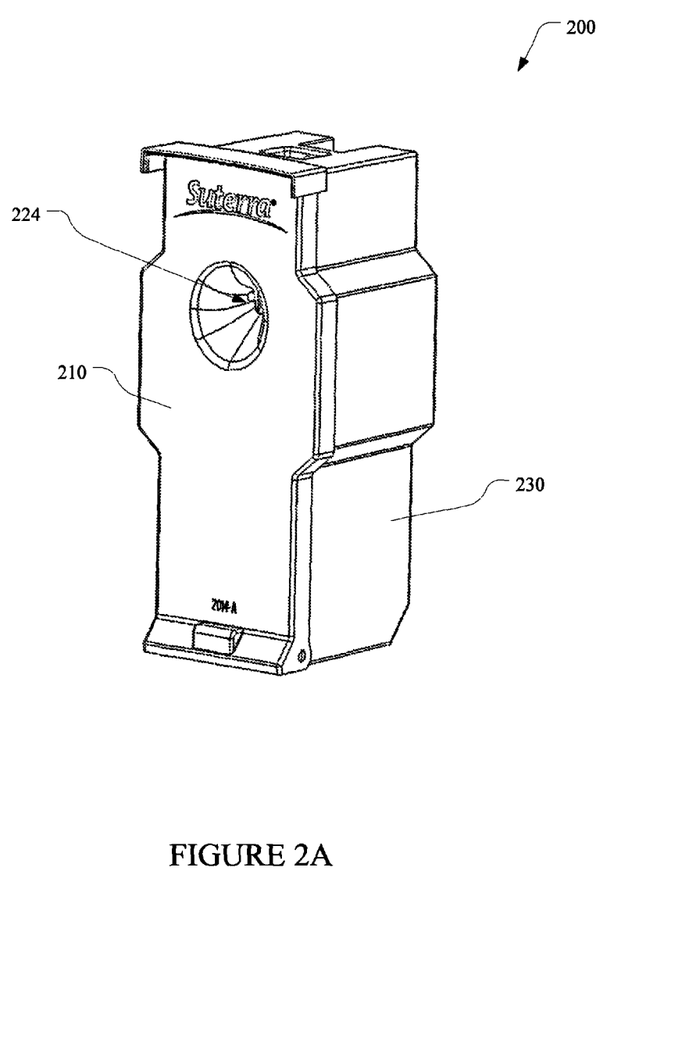
FIG. 2A is depiction of a puffer in a normal operating state in accordance with one or more embodiments of the present invention.
Figure 2B:
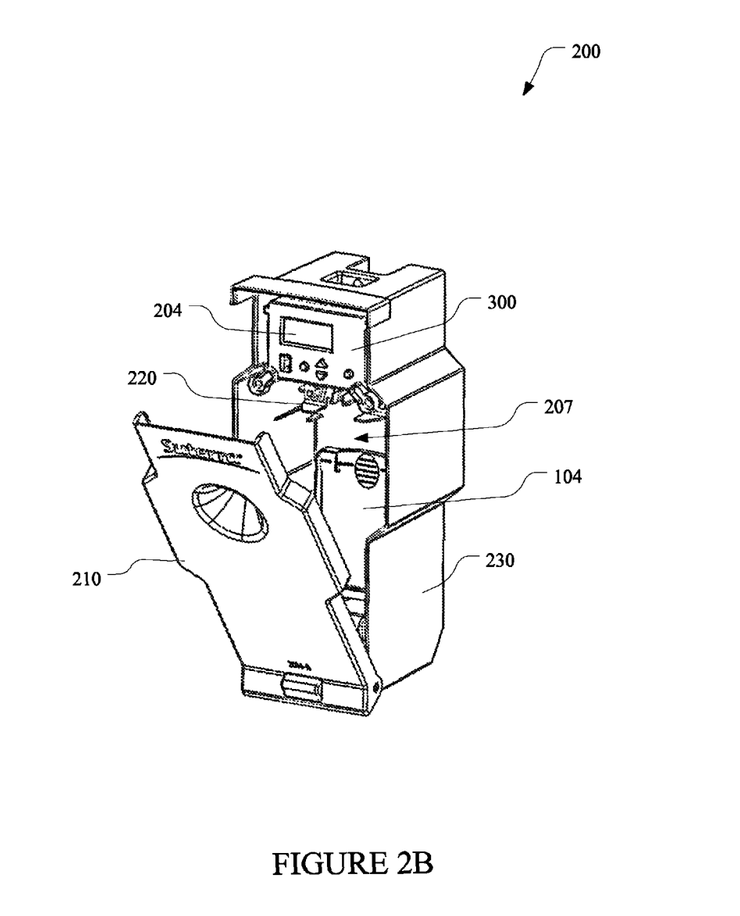
FIG. 2B is an illustration of a puffer cabinet of FIG. 2A with its door open to expose the control module.

FIGS. 2A and 2B are illustrations of a puffer cabinet in accordance with one or more embodiments of the present invention. FIG. 2A is an illustration of a puffer in a normal operating state (i.e. door closed) in accordance with one or more embodiments of the present invention. FIG. 2B is an illustration of a puffer cabinet with its door open to expose the control module. As illustrated, puffer cabinet 200 comprises of a plastic enclosure 230; wireless puffer control module 300; cabinet door 210; spray motor and hammer 220, battery pack 104; and metered aerosol can compartment 207. Puffer cabinet 200 sprays pheromones through spray nozzle 224.

The purpose of a puffer is to periodically dispense pheromones ("puffs") at predetermined time intervals based on the mode of operation. Parameters that control the operation of a puffer, such as mode of operation, along with a delay (e.g. in days) to enter operation and the clock, may be set via the remote control application 122 of master controller 120. These parameters may be saved in non-volatile memory in the puffer.

Each Puffer 200 may include an ON/OFF switch, one or more displays, e.g. Display 204, and control switches and/or buttons. Operation of the puffer is controlled and monitored by wireless puffer control module 300.

Figure 3:
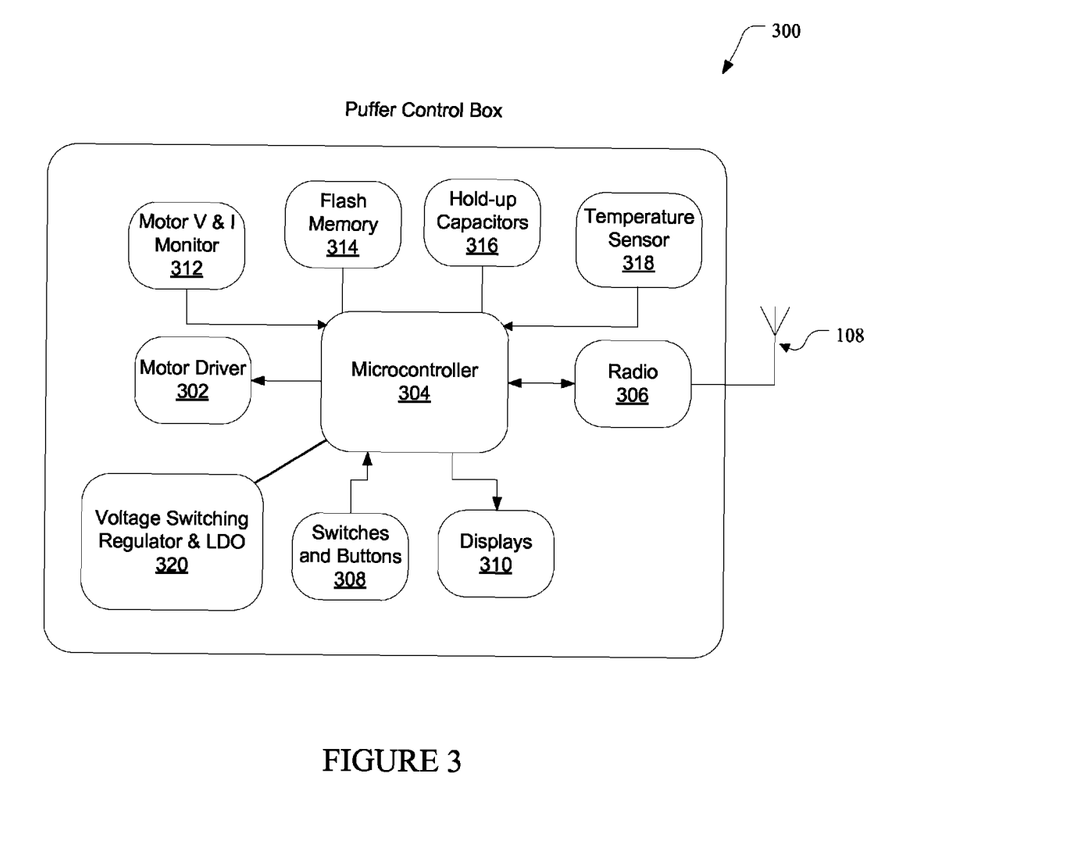
FIG. 3 is a functional illustration of the components of a wireless puffer control module in accordance with one or more embodiments of the present invention.

FIG. 3 is a functional illustration of the components of a wireless puffer control module 300 in accordance with one or more embodiments of the present invention. As illustrated, each puffer control module comprises Microcontroller 304 coupled to Radio 306; Motor Driver 302; Motor Voltage and Current Monitor 312; Flash Memory 314; Hold-up capacitors 316; Temperature Sensor 318; Regulator 320; Switches and Buttons 308; and Displays 310.

Radio 306 controls all wireless communications to and from the Puffer. In one or more embodiments, in addition to other wireless communication modes, e.g. classic Bluetooth, Radio 306 further comprises Bluetooth Low Energy communication mode. Radio 306 uses BLE advertisement functionality for communicating the status and configuration of the puffer unit to the master controller.

In one or more embodiments of the present invention, Radio 306 uses BLE listening mode for receiving mass programming information from master controller 120. Thus, Radio 306 is capable of operating in BLE advertisement, BLE listening mode and any other desired RF communication modes.

Voltage and Switching Regulator & LDO 320 supplies voltage and current to all hardware circuitry excluding the motor driver power supply. Both Low Dropout linear regulators (LDO) and switching regulators can provide the required operational power for the puffer.

Motor Driver 302 drives the DC motor that controls a motorized hammer 220 that automatically actuates the aerosol can 106. The hammer automatically returns to the rest position after the actuation.

Displays 310 may comprise LCD Display 204, Low Battery LED 216, and other suitable indicators, e.g. visual or auditory.

Hold-up capacitors 316 supply power to the control box electronics to retain its configuration settings in sleep mode while the batteries are removed for less than a specified period of time, e.g. one minute.

One or more embodiments of the puffer may utilize appropriate sensors to determine the status of the puffer, e.g. Motor Voltage and Current Monitor 312 and Temperature Sensor 318, and to confirm appropriate emissions from the Aerosol Can.

Each Puffer may also be configured to support Over-the-Air (OTA) updates. Updates may include but are not limited to internal time synchronization, puff frequency, delay, etc.

Referring back to FIG. 1, Master Controller 120 comprises Remote Control Application ("App") 122. Master Controller 120 is preferably a smart device, such as a smartphone, tablet, or any other smart device capable of radio communication. For instance, Master Controller 120 may be an iOS device from Apple, Inc., an Android device, etc. In a preferred embodiment, Master Controller 120 is Bluetooth Low Energy (BLE) enabled.

In one or more embodiments, the smart device 120 is Global Positioning System (GPS) enabled.

As illustrated in FIG. 1, each puffer 200 may communicate via wireless radio link 130 with remote master controller 120. However, in order to support the mass configuration and programming of a plurality of puffers (e.g. 50) a broadcast mode of RF communication is preferred. Thus, each puffer is capable of broadcasting its status and configuration via wireless broadcast 110 and each master controller broadcasts its advertisements through wireless broadcast 126. In BLE, the only broadcast messages are advertisements. Thus, in one or more embodiments, both the puffer 200 and the master controller 120 are BLE enabled devices that are capable of broadcasting and listening for broadcast messages. That is, each device acts both as a broadcaster and an observer. Application 122 uses BLE advertisement functionality for configuring and programming each puffer unit. Thus, in a preferred embodiment, Application 122 allows for quick and error free method of generating a desired puffer program, thus reducing the complexity of configuring and testing the puffer.

Figure 4:
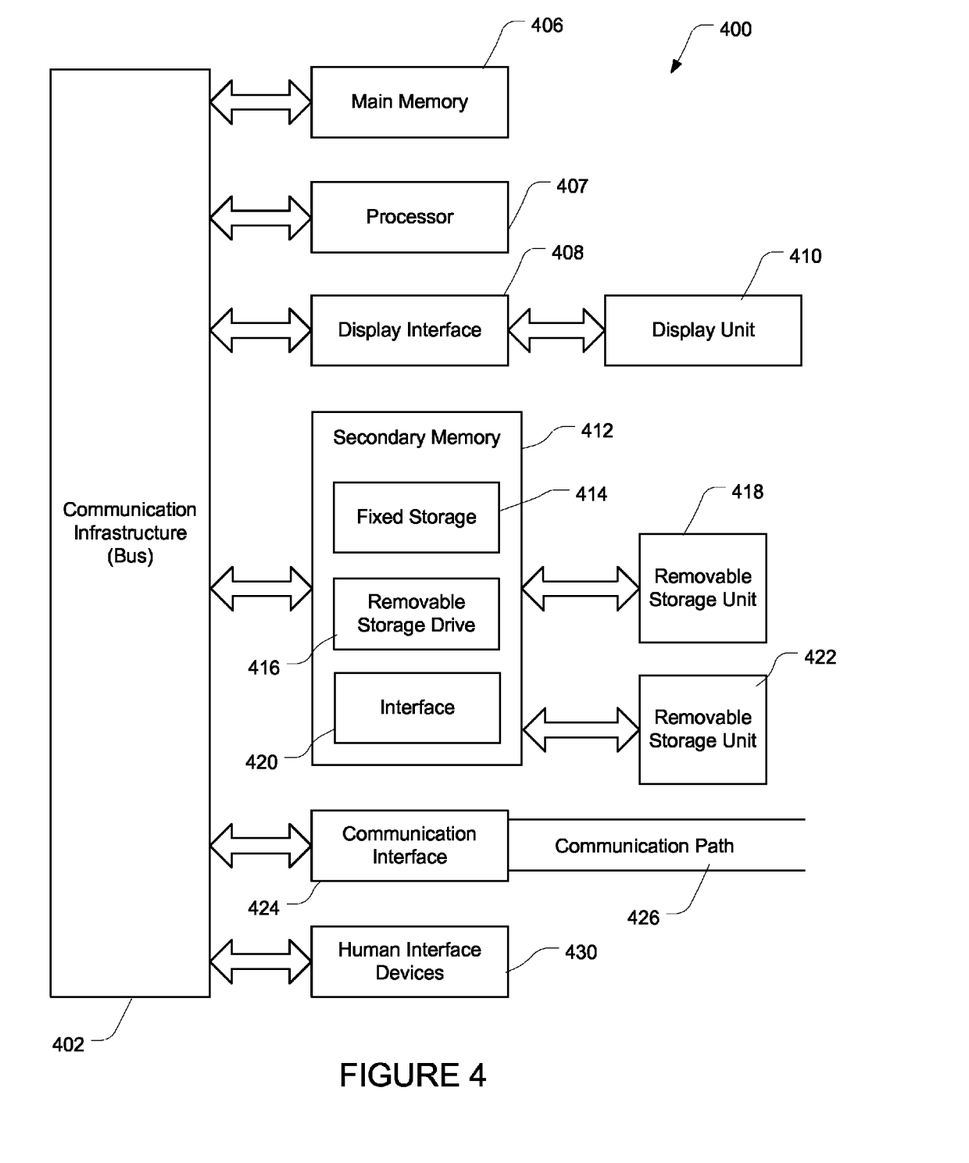
FIG. 4 is an illustration of functional elements of a generic master controller apparatus in accordance with one or more embodiments of the present invention.

In one or more embodiments of the present invention, App 122 uses BLE listening mode for checking status of each puffer. Thus, master controller 120 is capable of operating in BLE advertisement, BLE listening mode and any other desired RF communication modes. Master controller 120 comprises a radio (e.g. communication interface 424) that includes support for simultaneous operation as a BLE peripheral and a BLE observer. Those of skill in the arts would appreciate that Master controller 120 is not limited to the communication modes described herein, that other communication modes are possible and contemplated.

Master controller 120 is configured for one-to-many Puffers programming capability including the ability to download a program (clock, mode, delay, etc.) into one or more Puffers. Master controller 120 may further be configured for one to one (i.e. Master to Puffer) communications such that an individual Puffer cabinet may be selected to perform tests, receive status information, e.g. aerosol can emissions, and provide feedback to the Master.

In one or more embodiments, master controller 120 comprises a user interface for setting parameters of a program. For instance, master controller 120 may present the interface to the user through remote control application 122 to configure parameters into the program. Configurable parameters may include, but are not limited to the following:

| Parameter | Value/Control Type |
|---|---|
| Start Date & Time | Calendar and time picker UI (converted to delay time duration upon communication to puffer) |
| Puffing cycle start time | Time picker |
| Puffing cycle end time | Time picker |
| Puff interval | Time picker (minutes) |
| Company ID (e.g. peripheral name) | Text field |
| Site ID | |
| Temperature controlled puff | Temperature threshold |
| Reset puff count on program | On/Off switch |

In one or more embodiments, App 122 comprises a user interface with a display showing one or more of the puffer units within range that master controller 120 has received advertisements from. App 122 may also comprise location framework in order to capture the current GPS location and communicate it to a connected puffer unit. The application 122 may also retain the GPS location for each puffer unit and populate a map interface with the puffer locations displayed on it. The map may, for instance, use a first symbol (e.g. color code) to indicate puffers that have been properly programmed and a second symbol to indicate those puffers that are not properly programmed.

In one or more embodiments, the broadcast of the program and reading of puffer status advertisements may be accomplished by mode switching of the application 122 through peripheral mode (e.g. advertising the program parameters) and observer (or central) mode (e.g. scanning for puffer advertisements).

In one or more embodiments, the application 122 peripheral mode advertisement comprises a peripheral name, e.g. "WXYZ", with a service universally unique identifier (UUID), where the service UUID represents the desired program for the puffers in the field. Thus, the puffers in system 100 uses the peripheral name that comes across in the advertisement from remote master controller 120 to identify source and trigger that it is a mass programming event, and each puffer reads and interprets the service UUID as the desired program.

Mass Programming Advertisements

Bluetooth uses a 128-bit value in the form of a UUID in advertisement data to identify the services that a peripheral supports so devices can discover and connect. In one or more embodiments, each Puffer looks for a peripheral, e.g. a remote master controller, with a special name, e.g. "WXYZ", that is advertising and takes the UUID that is advertised with that special name and interprets it as a program. Each puffer receiving the UUID parses the information in the UUID to reprogram itself thus updating its broadcast advertisement to contain the new program information so the remote master controller device 120 knows that it has successfully programmed the Puffer, e.g. Puffer Cabinet 1.

The table below (Table 1) is an exemplary illustration of the 16 bytes that make up the 128-bit UUID advertised by the remote master controller in accordance with one or more embodiments of the present invention. Those of skill in the art would appreciate that other Byte configurations and Payload values are contemplated and may be used without deviating from the invention.

TABLE 1

Remote Master Controller Mass Programming Advertisement Layout (16 bytes)

| Byte Position | Payload |
|---|---|
| 0 | Puffer Mode (delay or active) |
| 1 | Reset Puff Count flag |
| 2 | Temperature Threshold (0 = no threshold) |
| 3 | Puffing Interval |
| 4 | Puffing Cycle Duration |
| 5 | Puffing Cycle Start Time |
| 6 | Puffing Program Start Date (4 bytes) |
| 7 | |
| 8 | |
| 9 | |
| 10 | Time Offset (difference between GMT & device in hours) |
| 11 | Site ID |
| 12 | Current Time (in seconds since reference date) - 4 bytes |
| 13 | |
| 14 | |
| 15 | |

Wherein, in one or more embodiments, "Puffer Mode" comprise "0x00" for Standby; "0x01" for Active; and "0x02" for Delay.

"Reset Puff Count" flag is a discrete "Yes", i.e. "0x01"; or "No", i.e. "0x00".

"Temperature Threshold" is the temperature value, in degrees Fahrenheit, below which puffing is discontinued. A value of "0x00" means there is no threshold thus no temperature restriction on puffing.

"Puffing Interval" is the time in minutes between puffs.

"Puffing Cycle Duration" is the total time in 7.5 minute increments for each puff cycle.

"Puffing Cycle Start Time" is the time of day in 7.5 minute increments for the beginning of each puff cycle.

"Puffing Program Start Date" is the time in seconds from Jan. 1, 2001, to the desired start date for the puffing program.

"Time Offset" is the offset time in hours of the device from GMT. Wherein the MSB (Most Significant Bit) is the sign bit and the remaining bits signify the number of hours.

"Site ID" may be used to achieve different results. For instance, in one or more embodiments, each puffer receiving the master controller UUID may filter the data based on the value of Site ID. For instance, a puffer may be configured such that if the Site ID of the puffer does not match the site ID of the configuration message being broadcast by the master controller, then the program is ignored.

"Current Time" is the time in seconds from Jan. 1, 2001, to current time.

Using the above mass programming layout, a master controller 120 desiring to advertise a program schedule with a start of Mar. 4, 2015, for example, may send a UUID with a human readable Hex value of 0100320f-6088-1aa6-8280-c0001aa79a14. Each puffer will parse the UUID as illustrated in Table 2, below.

TABLE 2

Exemplary Puffer Mass Programming Mar. 4, 2015 Start Date

| Byte Position | Payload | Comment |
|---|---|---|
| 0 | 0x01 | Active = 0x01, Standby = 0x00 |
| 1 | 0x00 | Reset puff count (NO) |
| 2 | 0x32 | 50 degrees |
| 3 | 0x0f | 15 minute interval |
| 4 | 0x60 | 12 hour duration |
| 5 | 0x88 | 17:00 start time |
| 6 | 0x1a | Start Date: Mar. 4, 2015 = 447120000 |
| 7 | 0xa6 | seconds from Jan. 1, 2001 |
| 8 | 0x82 | |
| 9 | 0x80 | |
| 10 | 0xe0 | -8 hours from GMT, in seconds |
| 11 | 0x00 | Site ID |
| 12 | 0x1a | Current Time: Mar. 4, 2015 11:53 am = |
| 13 | 0xa7 | 447191572 seconds from Jan. 1, 2001 |
| 14 | 0x9a | |
| 15 | 0x14 | |

Similarly, a master controller 120 desiring to advertise a program schedule with a start of May 1, 2015, for example, may send a UUID with a human readable Hex value of 0200000a-1284-1af24980-c0001aa79c114. Each puffer will parse this UUID as illustrated in Table 3, below.

TABLE 3

Exemplary Puffer Mass Programming May 1, 2015 Start Date

| Byte Position | Payload | Comment |
|---|---|---|
| 0 | 0x02 | Active = 0x01, Delay = 0x02 |
| 1 | 0x00 | Reset puff count (NO) |
| 2 | 0x00 | Temp Controlled puff off |
| 3 | 0x0a | 10 minute interval |
| 4 | 0x12 | 2:15 duration |
| 5 | 0x84 | 16:30 start time |
| 6 | 0x1a | Start Date: May 1, 2015 = 452131200 |
| 7 | 0xf2 | seconds from Jan. 1, 2001 |
| 8 | 0xf9 | |
| 9 | 0x80 | |
| 10 | 0xc0 | -8 hours from GMT, in seconds |
| 11 | 0x00 | Site ID = 0 |
| 12 | 0x1a | Current Time: Mar. 4, 2015 12:08 am |
| 13 | 0xa7 | |
| 14 | 0x9d | |
| 15 | 0x14 | |

Puffer Advertisements

An exemplary 25 Byte puffer advertisement is illustrated in Table 4 below, in accordance with one or more embodiments of the present invention.

TABLE 4

Exemplary Puffer Advertisement Layout

| Byte Position | Payload |
|---|---|
| 0 | Bluetooth Company Identifier - 2 bytes |
| 1 | |
| 2 | BLE Address - 6 bytes |
| 3 | |
| 4 | |
| 5 | |
| 6 | |
| 7 | |
| 8 | Current Time (in seconds since reference date) - 4 bytes |
| 9 | |
| 10 | |
| 11 | |
| 12 | Site ID |
| 13 | Time Offset (difference between GMT & device in hours) |
| 14 | Puffing Program Start Date - 4 bytes |
| 15 | |
| 16 | |
| 17 | |
| 18 | Puffing Cycle Start Time |
| 19 | Puffing Cycle Duration |
| 20 | Puffing Interval |

TABLE 4-continued

Exemplary Puffer Advertisement Layout

| Byte Position | Payload |
|---|---|
| 21 | Temperature Threshold |
| 22 | Battery Voltage - 2 bytes |
| 23 | |
| 24 | Current Temperature |
| 25 | Puffer Mode (delay or active) |

Wherein, in one or more embodiments, "Bluetooth Company Identifier" comprises a value representing the Company Identifier.

"BLE Address" is the unique address of the puffer's BLE device.

"Battery Voltage" is the current voltage level of the puffer's battery pack.

"Current Temperature" is the current temperature value at the puffer station, in degrees Fahrenheit.

Using the above puffer advertisement layout, an exemplary puffer UUID advertisement May 26, 2015 start date is illustrated in Table 5, below.

TABLE 5

Exemplary Puffer Advertisement with May 26, 2015 Start Date

| Byte Position | Payload | | Comment |
|---|---|---|---|
| 0 | 0xa1 | | Bluetooth Company Identifier |
| 1 | 0x00 | | |
| 2 | 0x01 | BLE Address | 01:23:45:67:8a:bc |
| 3 | 0x23 | | |
| 4 | 0x45 | | |
| 5 | 0x67 | | |
| 6 | 0x8a | | |
| 7 | 0xbc | | |
| 8 | 0x10 | Current Time | 449605904 seconds |
| 9 | 0x71 | (seconds since Jan. 1, 2001) | |
| 10 | 0xcc | | |
| 11 | 0x1a | | |
| 12 | 0x00 | Site ID | 0 |
| 13 | 0xb8 | Time Offset | −7 hours |
| 14 | 0x70 | Program Start Date | May 26, 2015 at 0700 |
| 15 | 0x51 | | |
| 16 | 0x14 | | |
| 17 | 0x1b | | |
| 18 | 0x78 | Puffing Cycle Start Time | 15:00 |
| 19 | 0x40 | Puffing Cycle Duration | 8:00 |
| 20 | 0x0f | Puffing Interval | 15 |
| 21 | 0x51 | Temperature Threshold | 40 degrees, enabled |
| 22 | 0xdf | Voltage | 6.221 |
| 23 | 0x17 | | |
| 24 | 0x49 | Temperature | 73 degrees |
| 25 | 0x00 | Puffer Mode | Standby (0) |

In operation, a puffer, e.g. Puffer Cabinet 1, periodically advertises a custom UUID as illustrated in Table 5 above. When mass programming information is received from an advertising remote master controller with the required special peripheral name, the puffer takes the accompanying UUID, parses it, and reprograms itself appropriately and updates its UUID to correspond to the program data from the special peripheral. Thus, the fields "Current Time", "Site ID", "Time Offset", "Program Start Date", "Puffing Cycle Start Time", "Puffing Cycle Duration", "Puffing Interval", "Temperature Threshold", and "Puffer Mode" are updated accordingly in subsequent broadcast advertisements of the puffer.

FIG. 4 diagrams a generic configuration of a device 400 that could serve as the Master Controller 120 of the present invention. Processor 407 may be coupled to bi-directional communication infrastructure 402 such as communication infrastructure system bus 402. Communication infrastructure 402 may generally be a system bus that provides an interface to the other components in the general-purpose computer system such as processor 407, main memory 406, display interface 408, secondary memory 412 and/or communication interface 424.

Main memory 406 may provide a computer readable medium for accessing and executed stored data and applications. Display interface 408 may communicate with display unit 410 that may be utilized to display outputs to the user of the specially-programmed computer system. Display unit 410 may comprise the display of a smartphone, tablet, or one or more monitors that may visually depict aspects of the computer program to the user. Main memory 406 and display interface 408 may be coupled to communication infrastructure 402, which may serve as the interface point to secondary memory 412 and communication interface 424. Secondary memory 412 may provide additional memory resources beyond main memory 406, and may generally function as a storage location for computer programs to be executed by processor 407. Either fixed or removable computer-readable media may serve as Secondary memory 412. Secondary memory 412 may comprise, for example, fixed storage 414 and removable storage drive 416 that may have an associated removable storage unit 418. There may be multiple sources of secondary memory 412 and systems implementing the solutions described in this disclosure may be configured as needed to support the data storage requirements of the user and the methods described herein. Secondary memory 412 may also comprise interface 420 that serves as an interface point to additional storage such as removable storage unit 422. Numerous types of data storage devices may serve as repositories for data utilized by the specially programmed computer system. For example, magnetic, optical or magnetic-optical storage systems, or any other available mass storage technology that provides a repository for digital information may be used.

Communication interface 424 may be coupled to communication infrastructure 402 and may serve as a conduit for data destined for or received from communication path 426. A Bluetooth Low Energy radio is an example of the type of device that may be coupled to communication infrastructure 402 to provide a mechanism for transporting data to communication path 426. Communication path 426 may comprise any type of wireless network or interconnection fabric that can transport data to and from communication interface 424. In a preferred embodiment, the interconnection fabric is BLE compatible radio waves.

To facilitate user interaction with the specially programmed computer system, one or more human interface devices (HID) 430 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 407 to trigger one or more responses from the specially programmed computer are within the scope of the system disclosed herein.

While FIG. 4 depicts a physical device, the scope of the system may also encompass a virtual device, virtual machine or simulator embodied in one or more computer programs executing on a computer or computer system and acting or providing a computer system environment compatible with the methods and processes of this disclosure.

While the invention herein disclosed has been described by means of specific embodiments and applications thereof, numerous modifications and variations could be made thereto by those skilled in the art without departing from the scope of the invention set forth in the claims.

What is claimed is:

1. A system for remotely controlling behavior of multiple devices comprising:
a plurality of programmable dispensers each configured to periodically dispense a chemical, wherein each one of said plurality of programmable dispensers includes a first radio frequency communication system having a first radio and a first microcontroller coupled to the first radio, wherein the first radio frequency communication system includes a dispenser listening mode and a dispenser advertisement mode, wherein during the dispenser advertisement mode the first radio is configured to periodically advertise a custom dispenser universally unique identifier (UUID) that includes a dispenser program schedule; and
a remote master controller, wherein said master controller includes a second radio frequency communication system having a second radio, wherein the second radio frequency communication system includes a master controller listening mode and a master controller advertisement mode, wherein during the master controller advertisement mode the second radio is configured to periodically broadcast a master controller UUID that includes a desired program schedule for each of said plurality of programmable dispensers, wherein said master controller listening mode is configured to receive said periodic advertisements of said programmable dispensers and thereby determine a configuration and operational status of each of said plurality of programmable dispensers,
wherein each one of said plurality of programmable dispensers is configured to receive said master controller UUID broadcast through the dispenser listening mode, and is configured to update the dispenser program schedule to match the desired program schedule.

2. The system of claim 1, wherein said first radio frequency communication system and said second radio frequency communication system each utilize a BLUETOOTH® Low Energy (BLE) communication protocol.

3. The system of claim 1, wherein said master controller is configured to parse said dispenser UUIDs to determine if each one of said plurality of programmable dispensers has been properly programmed to the desired program schedule.

4. The system of claim 1, wherein said master controller includes a user interface for setting parameters of said desired program schedule.

5. The system of claim 4, wherein said parameters of said desired program schedule include at least one of puffing cycle start date, puffing cycle start time, puffing cycle end time, puff interval, or temperature threshold.

6. The system of claim 1, wherein each one of said plurality of programmable dispensers is configured to search for a peripheral with a special name that is advertising a UUID.

7. The system of claim 6, wherein the peripheral corresponds to said master controller, and wherein each one of the plurality of programmable dispensers is configured to take the UUID that is advertised by the master controller and interpret the UUID as the desired program.

8. The system of claim 1, wherein the dispenser program schedule is configured to control dispensing of pheromones by said each one of said plurality of programmable dispensers.

9. The system of claim 1, wherein said master controller is a smart device.

10. A method for remotely controlling behavior of multiple devices comprising:
broadcasting a special peripheral name followed by a master controller UUID with a first radio and a BLUETOOTH® Low Energy (BLE) advertisement mode of a remote master controller, wherein said master controller UUID includes a desired program schedule for a plurality of programmable dispensers that are configured to periodically dispense a chemical;
listening for and receiving said master controller UUID at each of the programmable dispensers using a second radio and a BLE listening mode at each of the programmable dispensers;
parsing said master controller UUID at each one of said plurality of programmable dispensers and using information contained therein to update a dispenser program schedule at each one of the programmable dispensers;
creating a dispenser UUID at each one of said plurality of programmable dispensers that includes the updated dispenser program schedule;
broadcasting said dispenser UUID with the radio of the programmable dispenser using a BLE advertisement mode at each one of said plurality of programmable dispensers; and
listening for said advertisement of said dispenser UUID from each one of said plurality of programmable dispensers at the master controller to determine if the dispenser program schedule reflects said desired program schedule.

11. The method of claim 10, wherein said master controller includes a user interface for setting parameters of said desired program schedule.

12. The method of claim 11, wherein said parameters of said desired program schedule include at least one of puffing cycle start date, puffing cycle start time, puffing cycle end time, puff interval, temperature threshold, or combinations thereof.

13. The method of claim 10, wherein said dispenser program schedule is configured to control dispensing of pheromones by said each one of said plurality of programmable dispensers.

14. The method of claim 10, wherein said master controller is a smart device.

15. A system for remotely controlling behavior of multiple devices comprising: a master controller including a first BLUETOOTH® Low Energy (BLE) capable device with a first observer mode and a first advertisement mode for communication,
wherein the master controller advertisement mode is configured to broadcast a custom universally unique identifier (UUID) that includes a desired program schedule for a plurality of programmable devices; and
a plurality of programmable devices, wherein each one of said plurality of programmable devices includes a second BLE capable device with a second observer mode and a second advertisement mode for communication,
wherein each one of said programmable devices is configured to receive said custom UUID from said master controller via said programmable device observer mode, parse said custom UUID and reprogram a device program schedule, wherein the programmable device advertisement mode is configured to broadcast a programmable device UUID that includes the device program schedule, wherein said master controller is configured to receive said programmable device UUID from each one of said plurality of programmable devices via said master controller observer mode and to use information contained in the programmable device UUIDs to determine if each one of the programmable devices is using the desired program schedule.

16. The system of claim 15, wherein said master controller includes a user interface for setting parameters of said desired program schedule.

17. The system of claim 16, wherein at least one of said plurality of programmable devices is a puffer and said parameters of said desired program schedule include at least one of puffing cycle start date, puffing cycle start time, puffing cycle end time, puff interval, temperature threshold, or combinations thereof.

18. The system of claim 17, wherein said device program schedule is configured to control dispensing of pheromones by said each one of said plurality of programmable devices.

19. The system of claim 15, wherein each one of said plurality of programmable devices is configured to search for a peripheral with a special name that is advertising a UUID.

20. The system of claim 19, wherein the peripheral is said master controller, and wherein each one of the plurality of programmable devices is configured to take the UUID that is advertised by the master controller and interpret the UUID as the desired program schedule.

21. The system of claim 1, wherein the master controller is configured to populate a map interface with dispenser locations on the map interface, wherein the map interface includes a first symbol to indicate dispensers that have been properly programmed with the desired program schedule and a second symbol to indicate dispensers that are not properly programmed with the desired program schedule.

22. The method of claim 10, further comprising populating a map interface with the master controller, wherein the map interface includes dispenser locations, a first symbol to indicate dispensers that have been properly programmed with the desired program schedule, and a second symbol to indicate dispensers that are not properly programmed with the desired program schedule.

23. The system of claim 15, wherein the master controller is configured to populate a map interface with device locations on the map interface, wherein the map interface includes a first symbol to indicate devices that have been properly programmed with the desired program schedule and a second symbol to indicate devices that are not properly programmed with the desired program schedule.

* * * * *